D. P. WEBSTER.
Hand Planter.
No. 106,751. Patented Aug. 23, 1870.
Fig. 1.
Fig. 3.
Fig. 4.
Fig. 5.
Fig. 2.
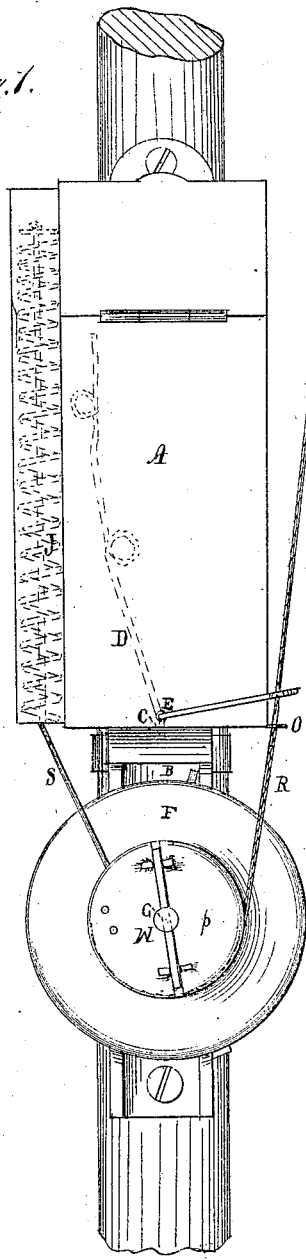
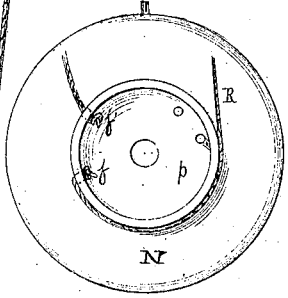
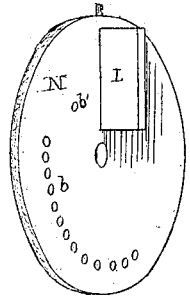
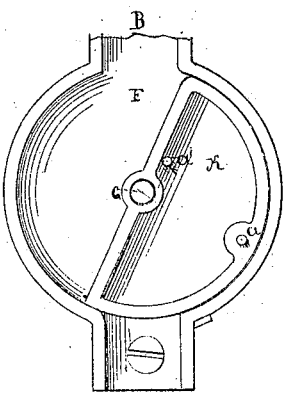
Witnesses:
N. H. Finckel
James L. Norris
Inventor:
Dexter P. Webster
by Dodgshun & Morris
Attorneys.

United States Patent Office.

DEXTER P. WEBSTER, OF BOSTON, MASSACHUSETTS.

Letters Patent No. 106,751, dated August 23, 1870.

IMPROVEMENT IN SEED-PLANTER AND FERTILIZER.

The Schedule referred to in these Letters Patent and making part of the same.

*To all whom it may concern:*

Be it known that I, DEXTER P. WEBSTER, of the city of Boston, in the county of Suffolk and State of Massachusetts, have invented a new and useful Improvement in Seed-Planters and Fertilizers; and I do hereby declare the following to be a full, clear, and exact description of the same, reference being had to the accompanying drawing forming part of this specification, in which—

Figure 1 is a front view of my improved seed-planter and fertilizer.

Figures 2, 3, 4, and 5 are views of detached parts.

Nature and Object of the Invention.

This invention relates to that class of devices known as seed-planters and fertilizers designed for planting corn, other seeds, and fertilizers in a reliable and uniform manner dispensing with complicated machinery, which, owing to such, are unreliable in their dropping or planting of the seed, on account of the tendency of some parts of the machinery becoming disengaged, thus often leaving large spaces unplanted, and, to this end, My invention consists—

First, in a regulating-cap or cover.

Second, in providing the feeding-tube with an agitator.

Third, in the combination of a regulating-cover with a reciprocating disk operated by certain devices hereinafter described.

Description.

A, in the accompanying drawing, represents the hopper or case for containing the seed or fertilizer to be dropped or planted, which is provided with a suitable opening for replenishing the same when desired.

At the bottom of this hopper or case is an opening, C, for the passage of the seed or fertilizer into the feeding-tube B, from thence into the cylinder or machine.

In this feeding-tube is located a spring, D, which passes through said tube, and is fastened to an upright, E, which spring performs the office of constantly keeping the seed or fertilizer in an agitated state when the machine is being used, thus at all times preventing the seed or fertilizer from becoming clogged or wedged in the feeding-tube B.

The cylinder F has an opening through which the seed or fertilizer passes before it is dropped or planted through an outlet at its lower part, and is connected with, or otherwise formed with the feeding-tube B of the hopper or case A, and is provided with one stop or more, as may be desired, to regulate the distance that the reciprocating disk K shall travel, so that a larger or smaller quantity of seed or fertilizer can be received into the cylinder, an important consideration, not only on account of the quantity of seed or fertilizer desired to be planted in separate points or hills, but also owing to the nature and quantity of the soil.

This disk K is located, and rotates upon a shaft, G, formed with the cylinder F, and is in the form of a half circle, upon the side of which is formed one projection, or more, for the purpose of entering a corresponding hole or holes in the cap N, which rotates with it on the shaft G.

The regulating-cap or cover N confines the rotating disk K within the cylinder F, and has formed with it, on the inside, a flange, L, and a series of holes, $b$ $b'$, the former operating on the outside of the disk within the cylinder, the latter for the reception of the projections $a$ $a'$, upon the side of the disk, which are the principal elements in connection with the cord and spring for operating the disk, to allow the seed or fertilizer to pass into and out of the cylinder.

Upon the top of this cap or cover N is a circular projection, $p$, having a series of holes, $f$ $f'$, for the cord, wire, or chains to operate the disk and cap.

The cord R, which is attached to the raised circular portion $p$, passing partly around it, extends up along the sides of the hopper or case, upon which is formed guides or eyes, O O, through which the cord or wire passes up within convenient reach for the operator's hand; or the cord or wire may pass up inside of the hopper or case, producing the same result.

This cord or wire R, in extending up from the raised circular projection $p$ of the cap or cover N, passes through a wire connected with the springs or agitator in the tube, thus preventing the tendency of the seed or fertilizer from wedging in the tube.

The cord S is attached at one end to the spring J, which is inclosed within a case formed with, or otherwise attached to the hopper or case A, the other end is secured to one of the perforations $p$, in the circular projection of the cap or cover N, through the tendency of which spring the rotating disk is returned to its proper position after the operator loosens the cord R, having dropped or planted the seed or fertilizer.

The rotating disk K, and cap or cover N, rotate freely upon the shaft G of the cylinder F, and are held in position by a nut or plate, W, which is either screwed or otherwise secured upon the shaft G by means of a pin passing over its top, through a hole formed in the said shaft G.

The machine being attached to a rod, hoe, or other suitable device, the operator, pulling upon the cord R, which extends down through the inside or outside of the box A, as may be desired, and attached to a hole in the circular projection, rotates the cap or cover N, which, on account of its flange L, and cavity, into which fits the projection *a* on the disk, rotates said disk, opening the entrance and closing the outlet, thus retaining the seed and fertilizing substance in the cylinder until the operator desired to drop the same, when on releasing the cord R, the spring on the hopper, being connected by a cord to the circular projection of the cap or cover N, causes the disk to rotate, closing the outlet and opening the entrance for a new supply of seed and fertilizing substance.

Having thus described my invention,

What I claim as new, and desire to secure by Letters Patent, is—

1. The reciprocating disk K, when combined and operating with the cover N, substantially as described.

2. The regulating cover or side, substantially as and for the purpose described.

3. The reciprocating disk K, cover N, combined and operating in connection with the cords or wires R and S, and spring J, substantially as herein set forth.

4. Providing the feeding-tube or box with an agitator, substantially as and for the purpose described.

To the above I have signed my name this 11th day of March, 1870.

DEXTER P. WEBSTER.

Witnesses:
　CHAS. B. F. ADAMS,
　A. W. ADAMS.